(No Model.)
P. LEE.
COOKING UTENSIL ATTACHMENT.
No. 473,399. Patented Apr. 19, 1892.
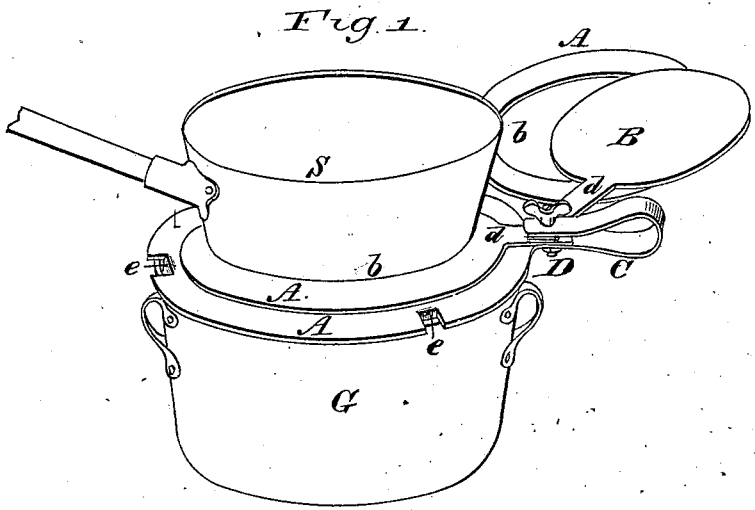
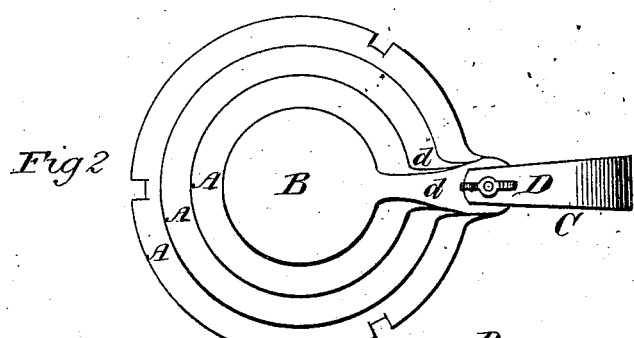
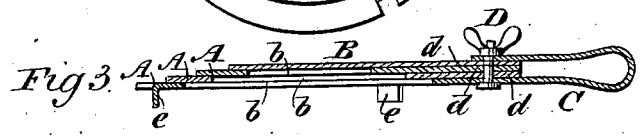
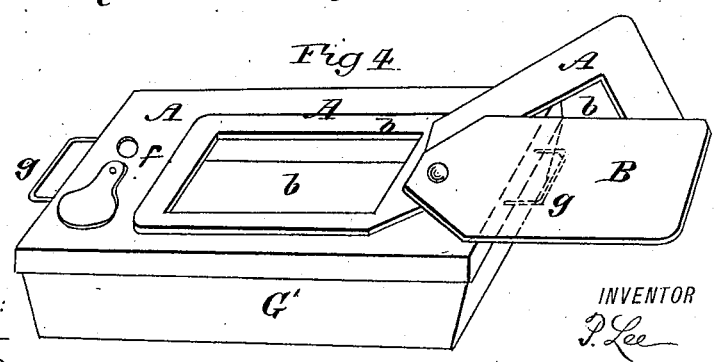
WITNESSES:
Paul Johst
C. Sedgwick
INVENTOR
P. Lee
BY
Munn & Co.
ATTORNEYS.

UNITED STATES PATENT OFFICE.

PATRICK LEE, OF BOISE CITY, IDAHO, ASSIGNOR TO HIMSELF AND GEORGE W. DILLIE, OF SAME PLACE.

COOKING-UTENSIL ATTACHMENT.

SPECIFICATION forming part of Letters Patent No. 473,399, dated April 19, 1892.

Application filed August 17, 1891. Serial No. 402,826. (No model.)

*To all whom it may concern:*

Be it known that I, PATRICK LEE, of Boise City, in the county of Ada and State of Idaho, have invented new and useful Improvements in Cooking-Utensil Attachments, of which the following is a full, clear, and exact description.

This invention consists in a multiple-cover-like device for cooking utensils of various kinds, including kettles, pots, boilers, and cooking or baking pans, to be used for steaming and cooking purposes generally, and adapted to fit and receive down within it cooking-vessels of various sizes and kinds; also, to act as a close cover, when desired, to pots, kettles, boilers, and cooking or baking pans, substantially as hereinafter described, and more particularly pointed out in the claims.

Reference is to be had to the accompanying drawings, forming a part of this specification, in which similar letters of reference indicate corresponding parts in all the views.

Figure 1 represents a view in perspective of the attachment as applied to a kettle or pot and as receiving a skillet for steaming purposes within or through it. Fig. 2 is a plan view of the multiple-cover-like device detached, and Fig. 3 a longitudinal vertical section of the same. Fig. 4 is a perspective view of a similar multiple cover-like device of rectangular instead of circular form as applied to a rectangular-shaped lower pan or boiler.

Referring, in the first instance, to Figs. 1, 2, and 3, A A represent a number of circular apertured metal plates or rings arranged one above the other and of diminishing sizes in an upward direction, so as to present different-sized apertures $b$ through them to receive and seat within and through them, respectively, different-sized cooking-vessels. There may be any number of these differently-sized apertured plates or rings, and over them, as a cover to the uppermost smallest-apertured plate, is a close plate B. The lower plate A is stationary and provided with a handle C for the purpose of adjusting and putting the whole device on or off the utensil over which it is applied; but the other apertured plates A and close plate B are pivoted, as by shanks $d$ and a thumb-screw D, to the handle C, so as to admit of them being swung laterally outward the one over or out of the way of the other.

By using a thumb-screw and making the handle a yielding one facility is afforded for increasing the number of apertured plates, if desired; but any other suitable pivot instead of the thumb-screw, also any other suitable handle, may be used, if desired. The lower one of the apertured plates A is or may be provided with cut-out pendent cleats $e$ for keeping it in a stationary position on the vessel it fits on or over.

In Fig. 1 the device is represented as having its lower apertured ring A seated on a kettle or pot G, which may contain water for cooking, as by steaming, and a skillet S, or it might be any other cooking utensil, is shown as seated within one of the movable apertured rings or plates adapted to receive it, and to provide for its entry to a proper depth within the pot or kettle G, the other movable plate (or it might be plates) is turned out of the way or to one side; or the vessel S, according to its size, might be seated within the lower apertured plate which has the largest opening in it and all the movable plates be swung to one side; or it might be seated within the uppermost movable apertured plate having the smallest opening in it and only the close plate B be turned to one side.

The object of the several apertured plates each succeeding one having an opening $b$ of less dimensions than the one next beneath it, is to accommodate different-sized cooking utensils in ordinary use without having recourse to purchasing special ones.

If desired, the whole device may be used as a close cover for pots, kettles, &c., by simply adjusting the movable apertured covers over the lower one and movable close plate B over the top apertured plate.

With this multiple-cover-like device cooking by steaming may be done very quickly and with great convenience by reason of the adaptability of the device to seat different-sized cooking-vessels within it and of being used on one and the same lower utensil.

The device is not restricted to either shape, size, or number of plates. Fig. 4 shows it of rectangular shape, with the edges of the lower plate turned down to form a rim adapted to fit over a lower boiler or pan G' and having a lid-closed aperture $f$ in it for the introduction of water to the pan, also having end handles $g$. This lower plate or lid has the movable plates A and close plate B pivoted directly to it, and the apertures $b$ in the stationary and movable plates A, adapted to receive other pans or vessels within them, are also of rectangular shape and diminish in size for each succeeding one in an upward direction.

Bread or biscuit may be baked or steamed by this construction of the device and will be found exceedingly light.

This invention essentially differs from a composite stove lid or cover and other like lids or covers made up of concentrically-arranged independent plates, the outer ones of which are of annular construction and serve to receive and hold the inner plates within them, inasmuch as all of said plates are not pivoted together laterally, but detached from each other, and lie in a common plane at their tops and require to be manipulated when it is necessary to remove any of them for the reception of a cooking-vessel of size to suit by separately lifting them out of their place through means of a common stove-lid lifter or other special tool, which is not always convenient to find. In my improved cover, which is a cooking-utensil attachment and not a stove-cover, no such awkward and inconvenient manipulation is requisite, inasmuch as the plates composing my cover are not in the same plane at their tops, do not fit one within the other, which makes them liable to stick, do not require a special tool to manipulate them, but may be readily pushed to and from their places, as required, by a sliding movement one over the other, which is readily done by reason of said plates being arranged or mounted one over the other, and all being in lateral pivotal connection, as described, and all carried by a common handle, which is an integral part of the whole.

Having thus described my invention, what I claim as new, and desire to secure by Letters Patent, is—

1. A multiple-cover device consisting of a series of parallel apertured plates fitted to slide one upon the other, the lowest plate having an overhanging handle, and a pivot extending through the handle and uniting the several plates, substantially as set forth.

2. In a multiple-cover-like device, as and for the purposes described, the laterally-pivoted apertured plates and upper close plate, all united by a yielding handle and thumb-screw where pivoted together, substantially as shown and described.

PATRICK LEE.

Witnesses:
G. W. DILLIE,
EDGAR WILSON.